(12) United States Patent
Fukunari et al.

(10) Patent No.: US 7,325,055 B2
(45) Date of Patent: Jan. 29, 2008

(54) METHOD AND SYSTEM FOR JUDGING RELIABILITY OF RESOURCES, AND PROGRAM FOR THE SAME

(75) Inventors: Chiho Fukunari, Yokohama (JP); Motoaki Hirabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 930 days.

(21) Appl. No.: 10/752,507

(22) Filed: Jan. 8, 2004

(65) Prior Publication Data

US 2004/0215767 A1 Oct. 28, 2004

(30) Foreign Application Priority Data

Mar. 19, 2003 (JP) .............................. 2003-074810

(51) Int. Cl.
*G06F 15/173* (2006.01)

(52) U.S. Cl. ...................... 709/224; 709/203; 709/216; 709/217; 714/1

(58) Field of Classification Search ................ 709/203, 709/216, 217, 224; 714/1
See application file for complete search history.

(56) References Cited

U.S. PATENT DOCUMENTS

| | | | | | |
|---|---|---|---|---|---|
| 5,522,070 | A | * | 5/1996 | Sumimoto | .................. 718/104 |
| 5,720,024 | A | * | 2/1998 | Saito et al. | ..................... 714/1 |
| 6,115,713 | A | * | 9/2000 | Pascucci et al. | .............. 707/10 |
| 6,557,025 | B1 | * | 4/2003 | Hattori et al. | .............. 709/202 |
| 6,873,610 | B1 | * | 3/2005 | Noever | ....................... 370/338 |
| 6,963,874 | B2 | * | 11/2005 | Kasriel et al. | ................ 707/10 |
| 7,167,907 | B2 | * | 1/2007 | Shaffer et al. | .............. 709/219 |
| 2003/0105867 | A1 | * | 6/2003 | Colrain et al. | .............. 709/225 |

* cited by examiner

*Primary Examiner*—Michael Won
(74) *Attorney, Agent, or Firm*—Antonelli, Terry, Stout & Kraus, LLP.

(57) ABSTRACT

A method and system of examining resource reliability in which a data acquisition section collects a utilization performance record of a resource previously recorded in a utilization performance record storage and data on the resource stored in a Web server and stores them, and a reliability judge section judges the reliability of the resource based on the data stored in the data acquisition section. The resource with high reliability is offered based on the results of the judgment in response to a request.

6 Claims, 10 Drawing Sheets

FIG.4

40: PERFORMANCE EVALUATION TABLE

| 41 | 42 | 43 | 44 | 45 | 46 | 47 | |
|---|---|---|---|---|---|---|---|
| DATE OF UPDATE | RESOURCE TYPE | MODEL | NUMBER OF EQUIPMENT | FAILURE RATE | RESPONSE SPEED | PERFORMANCE EVALUATION VALUE | --- |
| 2001.01.05 | COMPUTER | PC1535 | 100 | 0.01% | 15 HOURS | 5 | --- |
| 2002.05.06 | APPLICATION | AP1515 | 1000 | 0.00% | 1 HOUR | 1 | --- |
| 2002.06.11 | STORAGE | ST984 | 500 | 0.00% | 30 HOURS | 2 | --- |
| --- | --- | --- | --- | --- | --- | --- | --- |

FIG.5

50: CUSTOMER ENTERPRISE TABLE

| 51 | 52 | 53 | 54 | 55 | 56 | |
|---|---|---|---|---|---|---|
| ENTERPRISE CODE | DEPARTMENT CODE | DEPARTMENT NAME | e-mail | YEARS OF TRADE | CUSTOMER EVALUATION VALUE | --- |
| 103548 | 001 | DEPARTMENT a | ...@....jp | 2 YEARS | 3 | --- |
| 103549 | 102 | SECTION b | ...@....jp | 5 YEARS | 6 | --- |
| 103550 | 300 | DEPARTMENT c | ...@....jp | 20 YEARS | 1 | --- |
| --- | --- | --- | --- | --- | --- | --- |

FIG.6

60: TOTAL EVALUATION TABLE

| PERFORMANCE RECORD NUMBER | ENTERPRISE CODE | YEARS OF UTILIZATION | NUMBER OF TIMES OF CONTRACT | UTILIZATION FREQUENCY | AMOUNT | TOTAL EVALUATION VALUE | ... |
|---|---|---|---|---|---|---|---|
| 2001.01.05 | 103548 | 2 YEARS | 5 TIMES | UP | ¥100K | 2 | ... |
| 2002.05.06 | 103549 | 5 YEARS | ONCE | DOWN | ¥600K | 5 | ... |
| 2002.06.11 | 103550 | 20 YEARS | 40 TIMES | UN-CHANGED | ¥1000K | 8 | ... |
| ... | ... | ... | ... | ... | ... | ... | ... |

FIG.7

70: PERFORMANCE TABLE

| ENTERPRISE CODE | TYPE | MODEL | PRICE | PERFORMANCE | EXPANDABILITY | ... |
|---|---|---|---|---|---|---|
| 103548 | PC✻✻✻ | PC1535 | ¥900K | 1.3GHz | YES | ... |
| 103549 | AP✻✻✻ | AP1515 | ¥300K | 100b/s | NO | ... |
| 103550 | ST✻✻✻ | ST984 | ¥4500K | 880.8GB | YES | ... |
| ... | ... | ... | ... | ... | ... | ... |

FIG.8

80: ENTERPRISE TABLE

| 81 | 82 | 83 | 84 | 85 | 86 | |
|---|---|---|---|---|---|---|
| ENTERPRISE CODE | ENTERPRISE NAME | NUMBER OF EMPLOYEES | CAPITAL FUND | YEARS OF BUSINESS | URL | --- |
| 103548 | COMPANY A | 10,000 | ¥300M | 78 | www.*** | --- |
| 103549 | COMPANY B | 8,251 | ¥100M | 6 | www.*** | --- |
| 103550 | COMPANY C | 6,848 | ¥66M | 20 | www.*** | --- |
| ... | ... | ... | ... | ... | ... | ... |

FIG.9

90: RECEIVING TABLE

| 91 | 92 | 93 | 94 | 95 | 96 | 97 | 98 | 99 |
|---|---|---|---|---|---|---|---|---|
| ENQUIRY NUMBER | USER NUMBER | ACCEPTED DATE | RESOURCE TYPE | CONDITION-1 | CONDITION-2 | CONDITION-3 | ORDERED/ NOT-ORDERED | RELI-ABILITY |
| 12345678 | 12345 | 2002/12/1 | COMPUTER | MODEL PC1535 | PRICE ¥900K | COMPANY H | ORDERED | 60 |
| 45678912 | 45678 | 2002/12/2 | APPLICATION | MODEL AP1515 | — | — | NOT ORDERED | 25 |
| 32465485 | 35448 | 2002/12/3 | STORAGE | MODEL ST984 | COMPANY A | | ORDERED | 75 |
| ... | ... | ... | ... | ... | ... | ... | ... | ... |

FIG.13

130: ACQUISITION LIST TABLE

| UTILIZATION PERFORMANCE RECORD NUMBER | ENTERPRISE CODE | MODEL | PERFORMANCE EVALUATION VALUE | CUSTOMER EVALUATION VALUE | TOTAL EVALUATION VALUE | --- |
|---|---|---|---|---|---|---|
| 2001.01.05 | 103548 | PC1535 | 3 | 1 | 5 | --- |
| 2002.05.06 | 103549 | AP1515 | 5 | 9 | 6 | --- |
| 2002.06.11 | 103550 | ST984 | 9 | 6 | 9 | --- |
| --- | --- | --- | --- | --- | --- | --- |

FIG.14

140: JUDGMENT RESULT TABLE

| CAN-DIDATE | UTILIZATION PERFORMANCE RECORD NUMBER | ENTERPRISE CODE | MODEL | CONDITION-1 EVALUATION VALUE | CONDITION-2 EVALUATION VALUE | CONDITION-3 EVALUATION VALUE | --- | RELI-ABILITY |
|---|---|---|---|---|---|---|---|---|
| 1 | 2001.01.05 | 103548 | PC1590 | 9 | 8 | 15 | --- | 60 |
| 2 | 2002.05.06 | 103549 | PC1555 | 6 | 6 | 15 | --- | 25 |
| 3 | 2002.06.11 | 103550 | PC1531 | 5 | 5 | 10 | --- | 75 |
| --- | --- | --- | --- | --- | --- | --- | --- | --- |

FIG.15

| | | |
|---|---|---|
| ENTER CONDITION (* INDICATES YOU MUST ENTER) | | |
| USER NUMBER | | 151 |
| RESOURCE TYPE* | COMPUTER ▼ | 152 |
| CONDITION | MODEL PRICE | 153 |
| • MAKER | COMPANY A COMPANY B | 154 |
| • MODEL | PC1535 | 155 |
| • PRICE | | 156 |
| • OTHER | | 157 |
| | TRANSMIT | 158 |

150

METHOD AND SYSTEM FOR JUDGING RELIABILITY OF RESOURCES, AND PROGRAM FOR THE SAME

BACKGROUND OF THE INVENTION

When a user who considers using Web services wants to acquire the reliability of a resource that is to be used on the Web services, it is often difficult for the user to select the resource that the user desires because of the user's limited knowledge of the resource or to select from a massive amount of information on resources, and it takes enormous amount of time to do so. Thus, in order to solve such problem, the present invention proposes a method and system for judging reliability of a resource and program for the same so that the reliability of resource can be judged and that the resource can be assigned according to the results of the judgment if necessary.

When a truster wishes to commit or entrust a certain development task that needs technical expertise to a certain trustee, the truster owns information including technical level and field of experience of the trustee and entrustable period of time for use in determining whether the trustee is ready for being entrusted, such information constituting invisible asset (intangible property) the trustee owns. There is known a method for making intensive and effective retrieval/comparison/inspection of such information corresponding to those invisible assets that the truster owns (for example, see JP-A-2000-197263). However, no method for judging reliability of resources is disclosed.

Conventionally, an information system owned by a company is intended to be used only within the company itself and hence it suffices that the company obtains necessary resources by itself and does necessary maintenance operations.

However, in the recent advent of Web services wherein information systems of a plurality of different enterprises are integrated through a network so that companies can transmit and receive information between the companies without human assistance or intervention, thereby encouraging enterprise alliance and improving information propagation efficiency so that the services to the users can be expanded, such companies that own no resources have began to utilize the Web services and hence there have arisen the needs for acquiring the performance and reliability of the resources in addition to the information on the companies that developed the resources to be used on the Web services.

The user who considers using Web services obtains the performance and reliability of resources necessary for building up Web services from the information publicized on homepages, and judges the reliability. However, the user who has little or even some background knowledge of resources cannot judge the overall reliability of resources on the basis of the kinds and values of performance of vast amounts of resources.

In addition, since the research agencies that collect information for judging the reliability of resources from the users who have experience of having used those resources and provide the results of reliability judgment, are still limited in number, there is a problem that both the reliability of the research agencies themselves and the reliability of the judged results are not high.

SUMMARY OF THE INVENTION

In order to solve the above problems, the invention proposes a method and system for judging resource reliability wherein in order to judge the reliability of a resource necessary for utilizing a Web service, the system has:

a utilization performance record storage for storing information including performances and failure rates of resources that have been used and total evaluation results of companies including their response to user (i.e., the manner in which the companies treat the users);

a Web server that holds the performance of the resource and company information disclosed by the resource-holding companies;

a data acquisition section for acquiring from the utilization performance storage and Web server information necessary for judging the resource reliability; and a reliability judge unit for judging the reliability of the resource based on the resource condition received by the data acquisition section and a receiving section, wherein the results of resource reliability judgment are supplied from the receiving section to a user terminal and when an order of the resource is accepted, the receiving section sends an inquiry to the Web server and assigns the resource to the user.

A program that realizes the above functions or a recording medium having this program stored therein can also achieve the above object.

Other features of the invention will be better understood from the accompanying drawings and the description of this specification.

BRIEF DESCRIPTION OF THE DRAWINGS

FIG. 4 is a diagram showing an example of the data structure of a performance evaluation table 40 that lists the data structure of a performance evaluation storage section 31 stored in the utilization performance record storage 14.

FIG. 5 is a diagram showing an example of the data structure of a customer enterprise table 50 that lists the data structure of a customer enterprise storage section 32 in which the user having experience of having used resources stores not only the resources but also information on enterprises with which the use have done business deals.

FIG. 6 is a diagram showing an example of the structure of data of a total evaluation table 60 that lists the data structure of a total evaluation storage section 33 to totally judge the performance evaluation and enterprise evaluation for each resource.

FIG. 7 is a diagram showing an example of the data structure of a performance table 70 that lists the data structure of a performance storage section 21 which in turn stores the performance of resources held in the IDC.

FIG. 8 is a diagram showing an example of the data structure of an enterprise table 80 that lists the data structure of an enterprise scale storage section 22 for storing information on enterprises that have the resources.

FIG. 9 is a diagram showing an example of the data structure of a receiving table 90 that lists the data structure of a receiving section 18 for accepting the request of resource reliability judgment transmitted from the user terminal 11.

FIG. 13 is a diagram showing an example of the data structure of an acquisition list table 130 that lists the data structure of the data acquisition section 16 for acquiring data from the utilization performance record storage 14 of the user who has experience of having used resources, and data from the Web server 20 provided within the IDC.

FIG. 14 is a diagram showing an example of the data structure of a judgment result table 140 that lists the data structure of the reliability judge 17 for adding the results of reliability judgment to the rearranged or extracted data of the acquisition list table 130.

FIG. 15 is a diagram showing an example of information displayed on the user terminal 11.

DESCRIPTION OF THE EMBODIMENTS

Embodiments of the invention will be described with reference to the drawings. The terms used in the description of the invention will be defined first.

The Web service is the technique that is based on the techniques of XML (Extensible Markup Language) and SOAP (Simple Object Access Protocol), modularizes the functions of applications, and offers them as services on Web. For example, multiple different firms are consolidated through network, and the user can simply request the unified enterprise to offer services that support the needs of the user without inquiring or asking over a plurality of firms.

The conventional mode of the enterprise system is that, for booking a trip, the user has so far made a reservation to an air carrier when buying airline tickets, ordered in advance to a hotel when reserving a room, made reservations of other parts of the journey directly to specialized agencies, and bought them when word came that you got reservations. In contrast, in this Web service, a tourist agency integrates a plurality of enterprise systems of plane tickets, hotels and others so that the computers of the companies can transmit information of procedure up to the issue from application directly to each other through network without human assistance or hands.

The term resource is the resource necessary for the user to utilize the Web service, for example, computers such as personal computers and workstations, network equipment such as routers and hubs for connecting those computers to the network, applications for achieving documentation and numeric data processing, and storages such as hard disks for storing various types of data.

Figure 1:
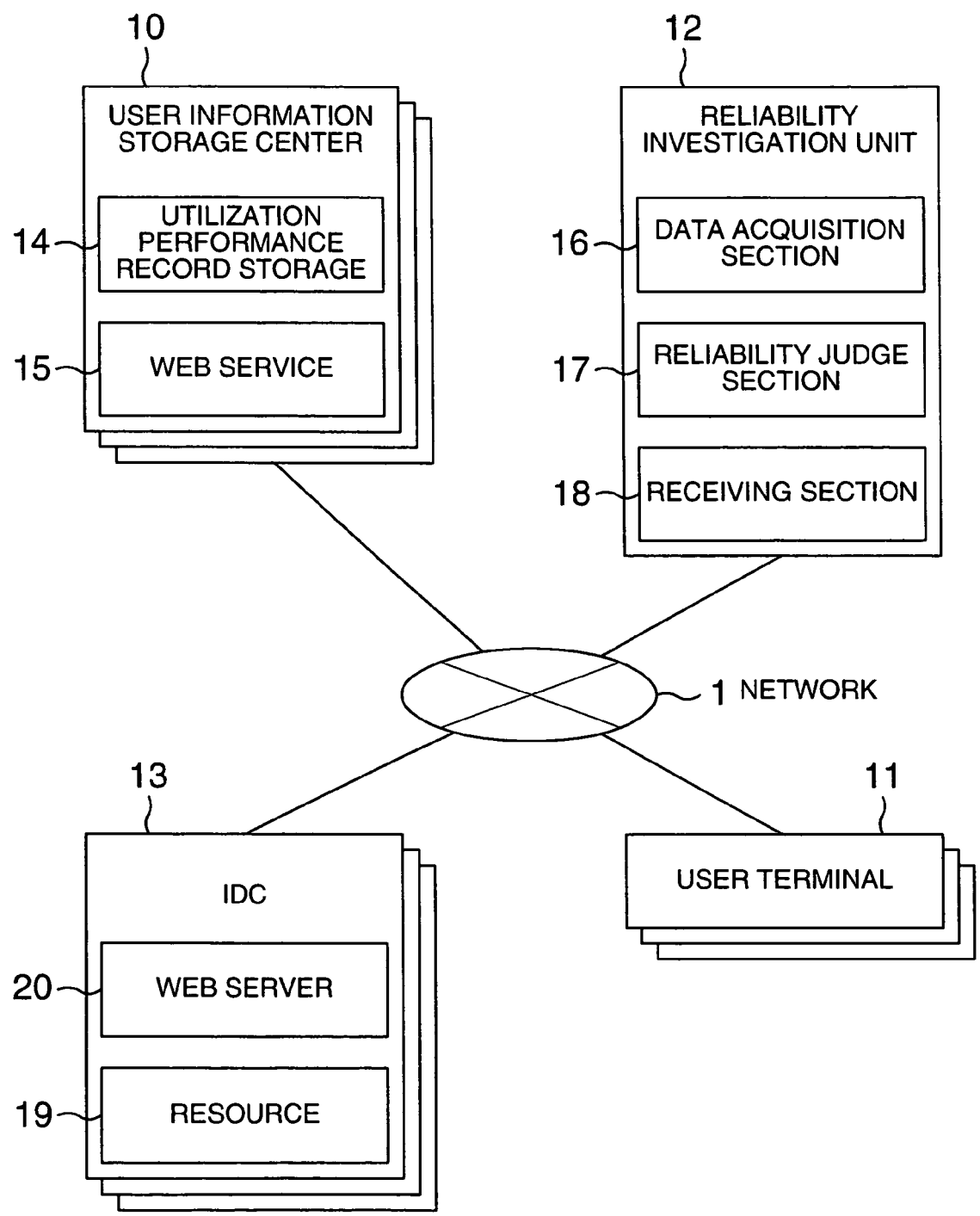
FIG. 1 is a diagram showing an example of the construction of the system for judging the reliability of resources according to the invention.

FIG. 1 schematically shows an example of the whole construction of a resource reliability judging system. This system includes a user terminal 11 of computer on which the user who has never used the Web system or utilizes the resource reliability judging system for the first time can receive necessary resource information using the computer, and a user information storage center 10 having a utilization performance record storage 14 provided for the user having experience of having used the Web system to store the utilization performance record, i.e., the past record of the Web system utilization and evaluation results thereof and a Web service 15 by which the computers can directly make communication between companies without human intervention or human hands. The system further includes an IDC (Internet Data Center) 13 having a Web server 20 and a resource 19 provided for the firms having and holding the above-mentioned resource to store the performance and busy condition (utilization status) of resources necessary for using the Web service, and a reliability investigation (examination) unit 12 having a receiving section 18 that accepts a request for judging resource reliability from the user terminal 11 or from the user information storage center 10 and inquires of the Web server 20 whether or not the resource can be offered, a data acquisition section 16 for acquiring from the utilization performance record storage 14 and Web server 20 the information meeting the resource condition set in the user terminal 11 and a reliability judge section 17 that judges the reliability of the resource by use of the information acquired from the user condition. These portions are interconnected together through a network 1 in the system.

Here, it is assumed that each of the user terminal 11, user information storage center 10 and IDC 13 may be provided singular or plural in number.

Figure 2:
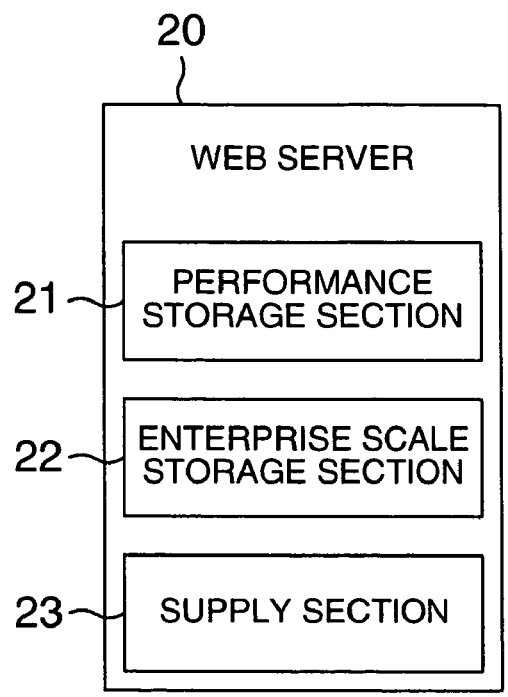
FIG. 2 is a functional block diagram showing an example of the function of the Web server 20 held by the IDC 13.

FIG. 2 is a functional block diagram showing an example of the function of the Web server 20 held in the IDC 13. The Web server 20 includes a performance storage section 21 for storing data of the performance of the resource held in the IDC 13, an enterprise scale storage section 22 for storing the number of payrolls (the number of employees) and capital fund of the enterprise that provides the resource and the URL of a homepage from which the user can get such information, and a supply section 23 for providing the resource in response to a resource supply request from the user.

Figure 3:
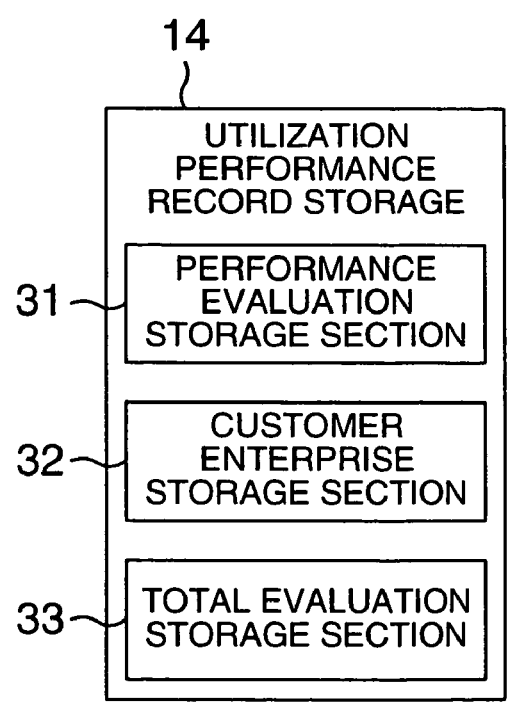
FIG. 3 is a diagram showing an example of the structure of data to be stored in the utilization performance record storage 14.

FIG. 3 is a diagram showing an example of the construction of the utilization performance record storage 14 for storing the utilization performance record and evaluation of the resource used when the user information storage center 10 introduced the Web service. This utilization performance record storage 14 includes the performance evaluation storage section 31, the customer enterprise storage section 32 and the total evaluation storage section 33. The performance evaluation storage section 31 stores data on the failure rate and response time or the time taken for responding to an enquiry at the time of failure with respect to the resource of the Web service provider with which a business transaction has been made, and a performance evaluation value that the user himself determined from the performance records of the business transaction. The customer enterprise storage section 32 stores data on the name and department of the enterprise from which a resource has been offered or with which a business deal (transaction) has been made and years (time length) of the business connection, and an evaluation value for the business deal with the enterprise. The total evaluation storage section 33 stores data on the length of years and the number of times (frequency of utilization) of business transaction per product and per non-product project such as solution, alliance or the like of a customer enterprise, data on the amount of contract money and data on manner or attitude of the customer enterprise (namely, how the enterprise treats the user), and the experience in digitized representation of the total evaluation thereof.

FIG. 4 is a diagram showing an example of the data structure of the performance evaluation table 40 that list the data structure of the performance evaluation storage section 31.

The table 40 includes, for example, resource type 42 showing the kind of resources such as computer and storage, type or model name 43 identifiable as a particular resource, number 44 of introduced resources, failure rate 45 indicating the rate of failure from the start of introduction and up to present, response speed 46 indicating the time taken for a support center or the like to provide a solution to a failure measured from the time of occurrence of the failure, performance evaluation value 47 showing the value (numeral)-converted resource performance evaluation result per user information storage center 10 that is estimated from those utilization performance records, and updated date 41 on which an item of the performance evaluation table 40 has been updated.

FIG. 5 is a diagram showing an example of the structure of data on the customer enterprise table 50 that lists the data structure of the customer enterprise storage section 32 in which the user who has used a resource stores information on not only the enterprise that has offered the resource but also the enterprise that has made a business transaction and is registered in the user information storage center.

The table 50 includes, for example, enterprise code 51 and department code 52 corresponding to company name and department name 53, department code 52, department name 53, e-mail address 54 for responding to inquiry from the user, years (length of time) of trade (business connection) 55, and customer (business deal) evaluation value 56 of trade period and attitude or behavior so far taken by the enterprise per user information storage center 10.

FIG. 6 is a diagram showing an example of the structure of data of the total evaluation table 60 that lists the data structure of the total evaluation storage section 33. The total evaluation is determined based on resource performance evaluation and enterprise evaluation per resource as well as utilization frequency (namely, how often relatively small products have been purchased from the resource manufacturing enterprise) and number of times of contracts (namely, how often relatively large products have been orders-placed/received) and other various factors, such as the length of business connection and chemistry with the resource manufacturing enterprise, all considered as a whole.

This table includes, for example, resource holding enterprise code 62 corresponding to a performance record number 61 stored in the performance evaluation table 40, years of utilization 63 of the resource, number of times of contract 64, utilization frequency 65, amount of orders placed/received 66, and total evaluation value 67 derived by evaluating such information per user information center 10.

FIG. 7 is a diagram showing an example of the structure of data of the performance table 70 that lists the data structure of the performance storage section 21 for storing the performance of the resource that each IDC 13 has and holds.

For example, the table includes, for enterprise code 71 of the company that manufactures the resource of interest, type 72 and model 73 of the resource, a price 74, performance 75, and expandability 76 which are performance information that becomes necessary for selecting the resource.

FIG. 8 is a diagram showing an example of the structure of data of the enterprise table 80 that lists the data structure of the enterprise scale storage section 22 for storing information on the enterprise that holds the resource of interest.

For example, the table 80 includes, for each enterprise code 81 and enterprise name 82, a number of corresponding payrolls 83 and capital fund 84, years of business 85 from its foundation and URL 86 of home page from which such information can be obtained.

FIG. 9 is a diagram showing an example of the structure of data of the receiving table 90 that lists the data structure of the data used by the receiving desk 18 that accepts a request of resource reliability judgment sent from the user terminal 11.

The receiving table 90 includes, for example, enquiry number 91 that is issued per accepted request, user's registered number 92 given only when the user is registered, accepted date 93, resource type 94, condition-1 95, condition-2 96 and condition-3 97 that are used to narrow the range of focus when examining the reliability, resource reliability judgment result 99 of the resource whose condition meets with a resource type 94, and ordered/not-ordered column 98 indicating that the user ordered the resource of interest or not.

Figure 10:
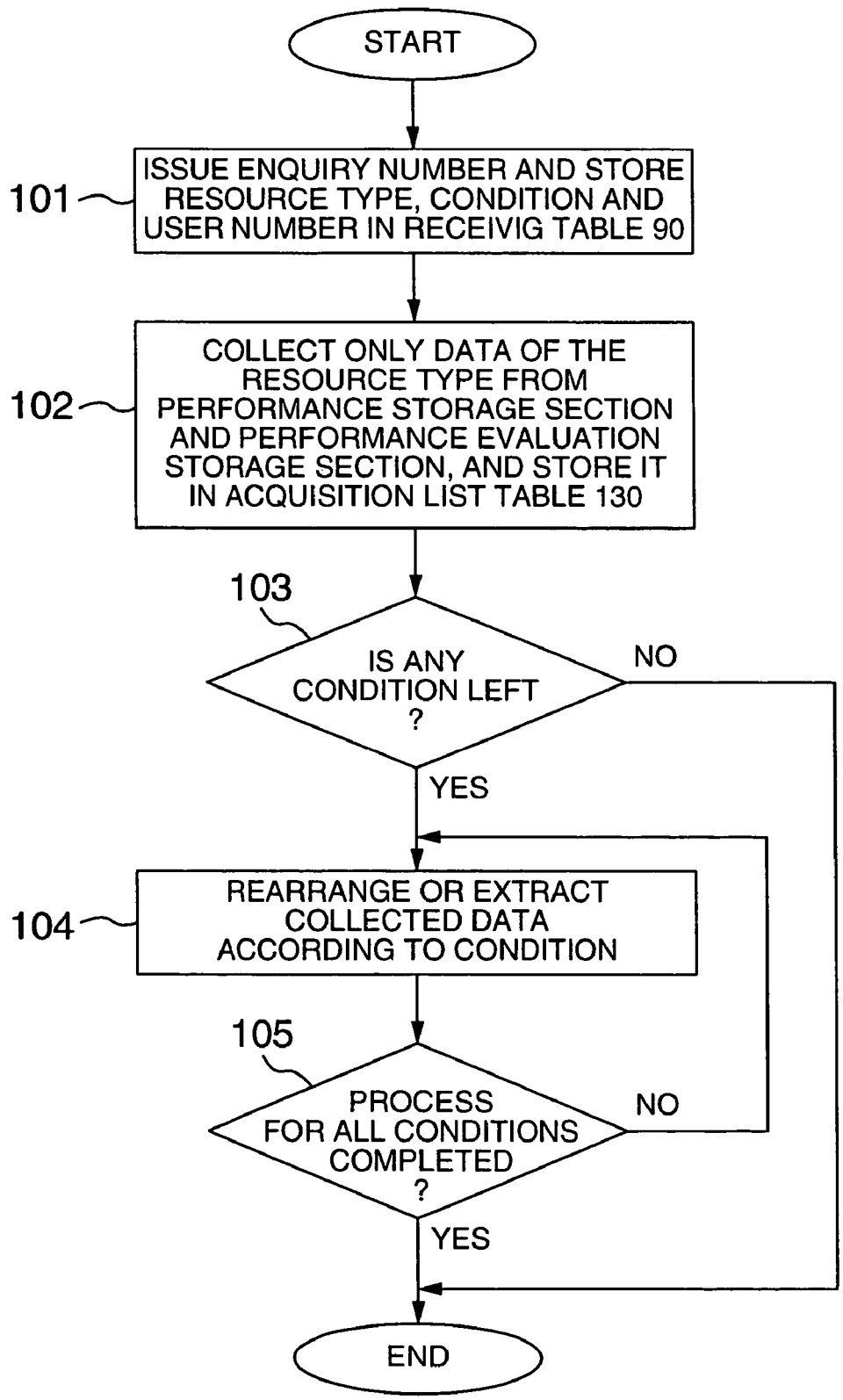
FIG. 10 is a flowchart showing the processes for acquiring information necessary for reliability judgment and rearranging data after accepting the reliability inspection request from the user terminal 11.

FIG. 10 is a flowchart showing the flow of processing from when a resource reliability examination request from the user terminal 11 is accepted by the receiving section 18 to when information necessary for reliability judgment is acquired and data is rearranged.

In step 101, when the request is sent from the user terminal 11, the resource type, condition, user number and the corresponding inquiry number are provided and stored together with received date and time in the receiving table 90.

In step 102, data relating to the resource type stored in step 101 is collected from the performance evaluation storage section 31 and performance storage section 21 and stored in the data acquisition section 16.

In step 103, decision is made of whether other resource conditions than the resource type are specified in step 101 and if not, then the process ends without rearrangement.

In step 104, when other conditions have been specified, the data obtained in step 102 is rearranged and extracted based on the conditions in order of from the condition of the lowest priority level to the highest.

In step 105, decision is made of whether the rearrangement has been completed based on all the conditions and if not completed yet, then the step 104 is executed based on the next higher priority condition. The process in step 104 is repeated until the process according to all conditions is completed.

Figure 11:
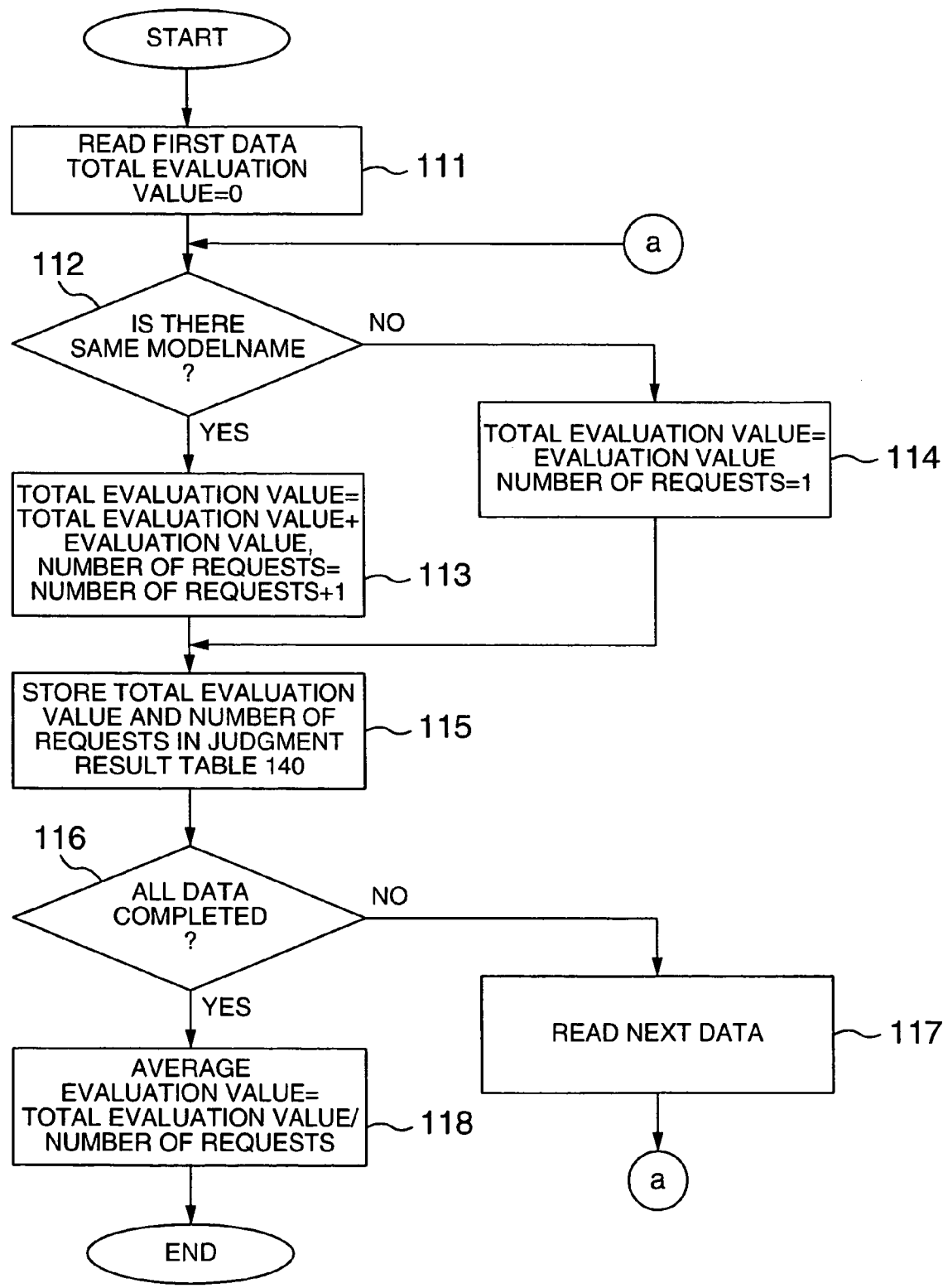
FIG. 11 is a flowchart showing the processes for judging the reliability by use of the rearranged data in FIG. 10.

FIG. 11 is a flowchart showing the flow of processing for judging the reliability by using the rearranged data obtained in FIG. 10.

In step 111, the head data of the acquisition list table 130 after rearranged in step 105 is read and the total evaluation value is set to zero point. In step 112, decision is made of whether the same type name is included in the data so far read.

In step 113, when there is the same type name in step 112, the resource evaluation value of the individual user is added to the total evaluation value, and the number of request is also incremented by one request.

In step 114, when the decision whether the same type name exists or not in step 112 is No, the resource evaluation value of the individual user is stored as-is as the total evaluation value, and the number of request is counted as one and stored.

In step 115, the total evaluation value and number of requests determined or calculated in step 113 or 114 are stored in the original data read in step 111 or 117 in the reliability judgment result storage table 140. Thus, the reliabilities of the resources of the same type name are added one after another. In step 116, decision is made of whether all data is completely read. In step 117, when all data is not completely read in step 116, the next data in the acquisition list table 130 is read and the process returns to step 112.

In step 118, the evaluation values of all data are completely added and divided by the number of requests to produce an average evaluation value.

As the number of samples increases, the reliability of the evaluation value becomes higher.

Figure 12:
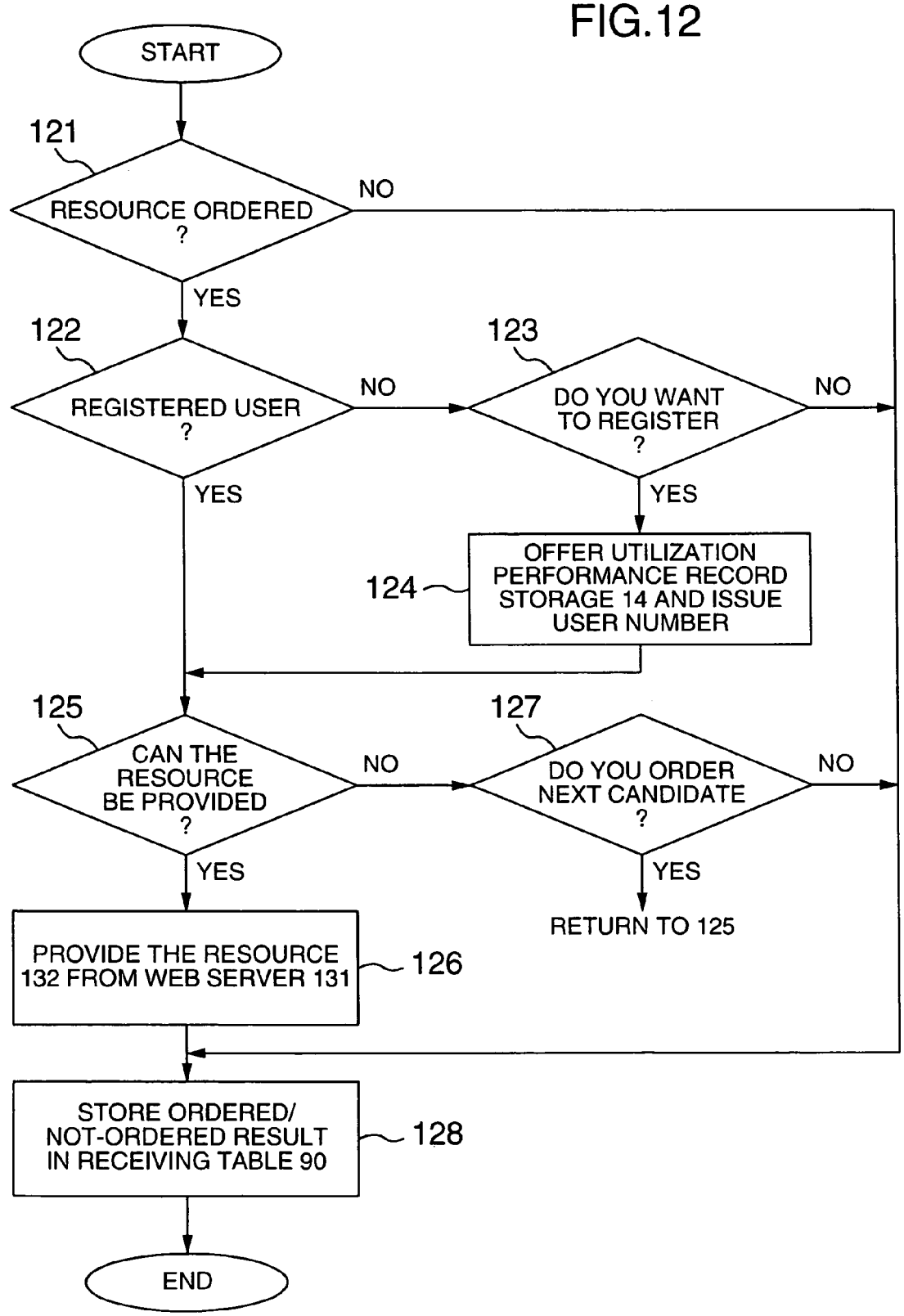
FIG. 12 is a flowchart showing the processes up to the end of the enquiry process that changes depending on the fact that the user orders the resource after receiving the offered results of resource reliability judgment.

FIG. 12 is a flowchart showing the flow of processing up to the end of the inquiry process that changes depending on whether the user orders the resource or not according to the resource reliability judgment result obtained in FIG. 11.

In step 121, decision is made of whether the user applies for the use of the resource of interest or not. In step 122, decision is made of whether the user who enquired is a registered user. In step 123, the user who is not registered yet is asked whether user registration is desired or not.

If the user registration is not made, the user cannot be offered the resource and the process jumps to step 128 where the registration status is made no.

In step 124, the utilization performance record storage 14 having the performance evaluation table 40, the customer enterprise table 50 and the total evaluation table 60 is supplied to the user terminal 11 who newly desires user registration, and a user number is issued to the user.

In step 125, the receiving section 18 asks the supply section 23 in the Web server 20 to examine and decide whether the resource applied for in step 121 can be offered.

In step 126, when the decision in step 125 is yes, namely, the resource can be offered, the procedure for supplying the resource of interest is sent from the Web server 20 to the user terminal 11.

In addition, the yes/no status is turned yes.

In step 127, when the decision in step 125 is no, namely, there is no resource that can be offered, the user terminal 11 is asked if it will apply for the next candidate. If the decision in step 127 is yes, the next candidate is selected from the candidates 141 of the judgment result table 140 and the process jumps to step 125.

If the decision in step 127 is no, namely, when the user terminal does not apply for the next candidate, the process jumpss to step 128 where the yes/no status is made no.

In step 128, the yes/no status is stored in the yes/no 98 of the front desk table 90.

FIG. 13 is a diagram showing an example of the data structure of the acquisition list table 130 that lists the data structure of the data acquisition section 16 for acquiring data of the utilization performance record storage 14 of the user having used a resource and also acquiring data held by the Web server 20 in the IDC.

The table 130 includes, for example, performance record number 131, enterprise code 132, type or model name 133, performance evaluation value 134, customer (business deal) evaluation value 135 and total evaluation value 136.

FIG. 14 is a diagram showing an example of the data structure of the judgment result table 140 that lists the data structure of the reliability judge section 17 which makes the reliability judgment on the rearranged or extracted data of the acquisition list table 130.

The table 140 includes, for example, candidate number 141, performance record number 142, enterprise code 143, type name 144, evaluation value 145 under condition-1, evaluation value 146 under condition-2, evaluation value 147 under condition-3 and reliability 148.

FIG. 15 is a diagram showing an example of information displayed on the user terminal 11.

For example, the user who conducted reliability examination in the past and made a user registration enters the user number in the user number 151, selects the resource type to be reliability-examined from the pull-down menu of the resource type 152, enters an item name of condition in condition 153 in order to set an item as a condition, enters a plurality of conditions, if desired, with a space thereamong. The user further enters, with respect to the items set in the condition 153 and at respective corresponding portions, enterprise name in maker 154 if the user wishes to specifies a maker name, enters a type or model name in type 155 if the type or model name is desired to be specified, enters a desired price in price 156 if the price range is to be inputted, enters a key word of desired condition in other 157, and push a send button 158 which causes the request for resource reliability examination to be transmitted from the user terminal 11 to the receiving section 18.

Note that priority order is given as condition-1, condition-2, condition-3 . . . in order of being entered in the condition 153

According to the invention, the resource that fits to the needs of the user can be decided and assigned by judging the reliability of the resource which is necessary when using the Web service.

In addition, the companies that hold the resources or companies that develop resources can improve the performance of the resources according to that information.

According to the invention, the resource that meets the needs of the user can be determined and assigned by judging the reliability of the resource which is necessary when using the Web service.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A resource reliability judging system comprising:
 a user terminal to be used by a user who receives resource information;
 an Internet data center that supplies performance information on a resource held by said Internet data center;
 a user information storage center having a utilization performance record storage for storing utilization performance data of the past of said resource and evaluation result data determined by a user who used said resource; and
 a reliability examination unit for supplying said resource information to said user terminal, wherein said reliability examination unit comprises:
 a receiving section for accepting a resource reliability judgment request from said user terminal, said request including specification of resource type and condition;
 a data acquisition section that accepts said resource reliability judgment request to acquire said performance information from said Internet data center and said utilization performance record data and said evaluation result data from said user information storage center; and
 a reliability judge section for judging the reliability of said resource based on said data acquired by said data acquisition section and said resource type and condition specified by said user;
 wherein said performance information includes information for identifying a company that manufactures said resource, and information on a type, price, performance and expandability of said resource that are required to select said resource.

2. A resource reliability judging system according to claim 1, wherein said resource reliability judging system includes a storage, an application and a computer that are required to configure a Web service.

3. A resource reliability judging system according to claim 2, wherein said Internet data center supplies not only said performance information but also a number of payrolls, capital fund, years of business and homepage's URL of said company.

4. A resource reliability judging system according to claim 2, wherein said utilization performance record storage has a failure rate of said resource and a response time taken for responding to an inquiry at the time of occurrence of a failure or trouble as said utilization performance record of the past stored in association with said resource type that indicates the kind of said resource.

5. A resource reliability judging system according to claim 4, wherein said utilization performance record storage has, as an evaluation result by the user, an evaluation value for said resource performance and an evaluation value for said company with which said user did business.

6. A computer-readable recording medium having stored therein a program for resource reliability judgment, said program including:

a code for accepting a request for resource reliability judgment including specification of a resource type and condition sent from a user terminal used by a user who receives resource information;

a code responsive to said request for resource reliability judgment to acquire performance information on said resource held by an Internet data center from said Internet data center, and a past utilization performance record of said resource and evaluation result data made by a user who used said resource from a user information storage center; and a code for judging the reliability of said resource based on said acquired data and said resource type and said condition specified by said user, wherein said performance information includes information for identifying a company that manufactures said resource, and information on a type, price, performance and expandability of said resource that are required to select said resource.

* * * * *